INVENTOR
MALCOLM W. MORSE
BY Pennie, Davis,
Marvin and Edmonds
ATTORNEYS

Sept. 10, 1940.  M. W. MORSE  2,213,992
TENSION EQUALIZER
Filed Aug. 19, 1938  4 Sheets-Sheet 2
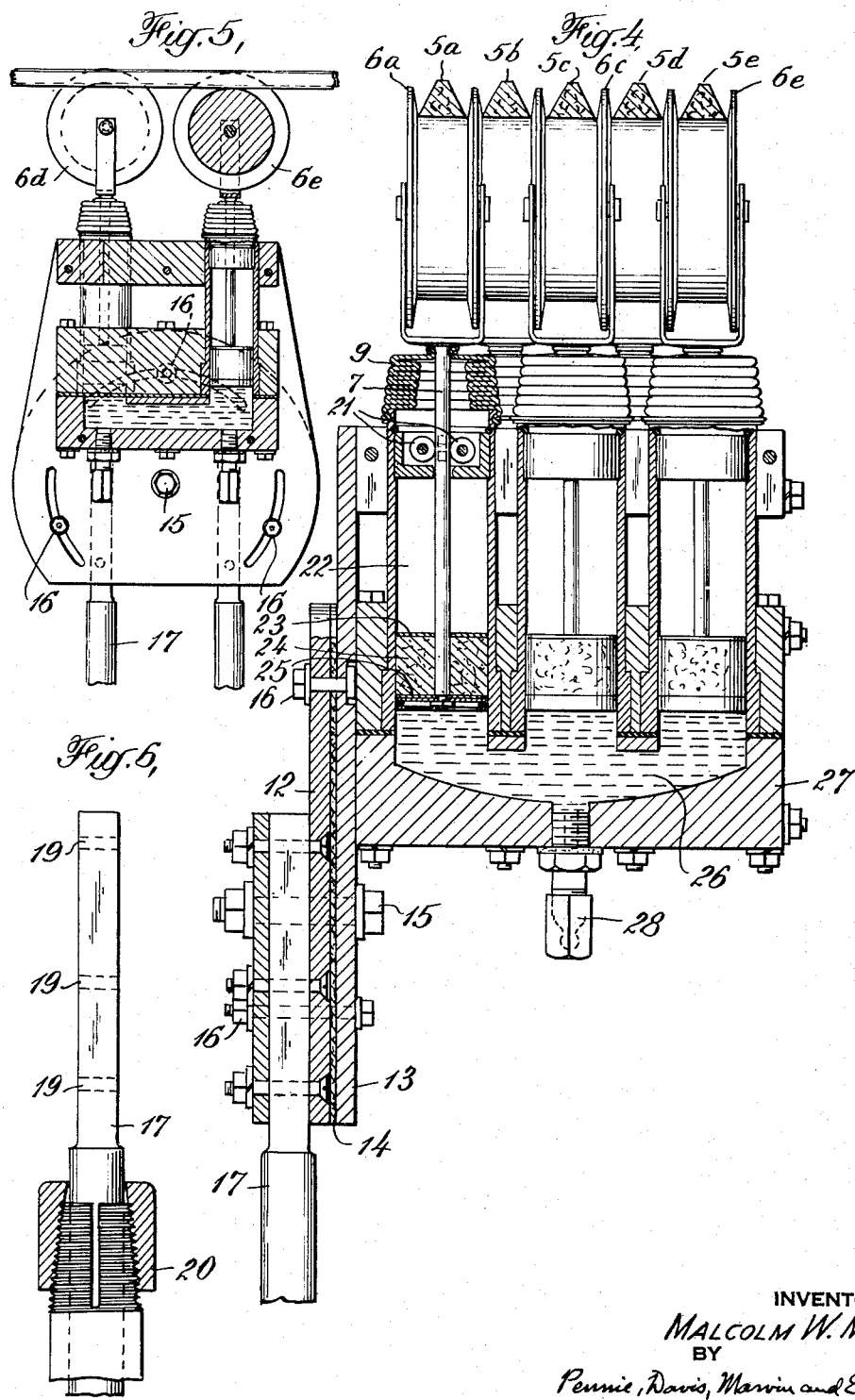
INVENTOR
MALCOLM W. MORSE
BY
Pennie, Davis, Marvin and Edmonds
ATTORNEYS Sept. 10, 1940.                M. W. MORSE                2,213,992
                            TENSION EQUALIZER
                        Filed Aug. 19, 1938         4 Sheets—Sheet 3
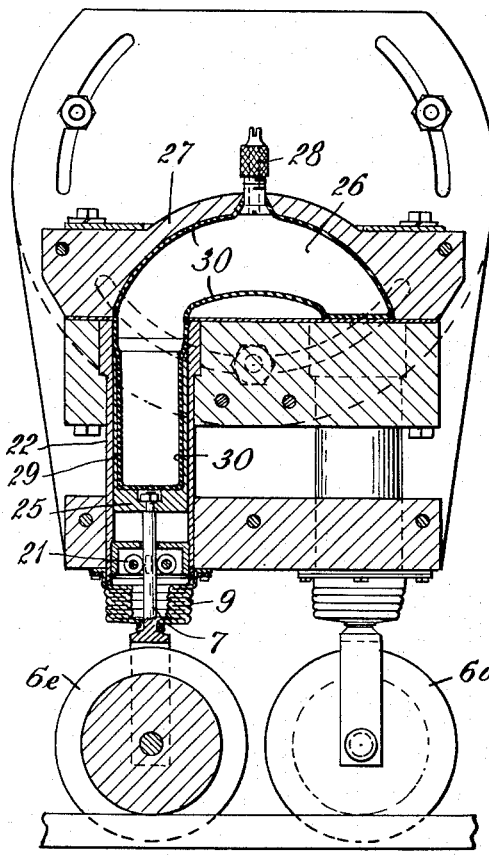
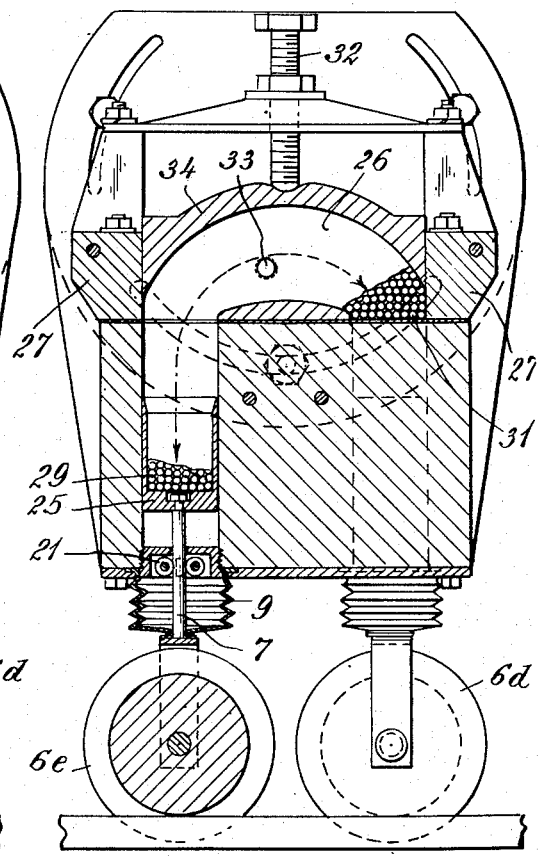
INVENTOR
MALCOLM W. MORSE
BY
Pennie, Davis, Marvin and Edmonds
ATTORNEYS Sept. 10, 1940.　　　　M. W. MORSE　　　　2,213,992

TENSION EQUALIZER

Filed Aug. 19, 1938　　　　4 Sheets-Sheet 4

INVENTOR
MALCOLM W. MORSE
BY
Pennie, Davis, Marvin and Edmonds
ATTORNEYS

Patented Sept. 10, 1940

2,213,992

UNITED STATES PATENT OFFICE 2,213,992

TENSION EQUALIZER

Malcolm Wilcox Morse, Boston, Mass.

Application August 19, 1938, Serial No. 225,665

6 Claims. (Cl. 74—242.11)

This invention relates to the transmission of mechanical power, and especially to transmission systems of the multiple-belt type. More particularly the invention relates to mechanisms which control the tension of such belts.

It is generally conceded that for many purposes multiple-belt drives offer a large number of advantages as compared with single-belt drives, especially in large power installations for which the advantages are so well understood as to require no discussion here.

With the introduction of multiple-belt transmission of power there appeared a problem which did not exist with the single-belt type of transmission, namely, that of keeping all of the belts under equal tension. This problem obviously increases with the number of belts, because it is extremely difficult to secure several belts of the same length and which will maintain the same length throughout their life. It is apparent that if the belts differ in length they will not carry equal fractions of the power transmitted, with the result that some of them will be overloaded and will wear out prematurely. Another disadvantage from unequal loading of the belts is that the sheaves of the prime mover and of the driven apparatus will be subjected to uneven strains which may injure the shafts and bearings. Furthermore, the whipping of a partially loaded belt causes vibration and excessive wear both on the belt and the bearings as well as resulting in inefficient power transmission. It will therefore be apparent that in large installations where many belts are used in multiple drive, in which case shut-downs are expensive, it is especially important that as many as possible of these and other attendant disadvantages be avoided. The present invention avoids the outlined disadvantages to a large degree, and in doing so effects a more economical operation of the drive during the life of the belts by transmitting the power more efficiently than heretofore.

Accordingly this invention includes preferably one idler pulley for each belt, means being provided to force each idler pulley against its associated belt with a pressure related to that required for each of the other idler pulleys, in order to maintain all of the belts under equal tension.

In one preferred embodiment of the invention each idler pulley is mounted on a piston rod attached to a piston operating in a cylinder, there being a conduit interconnecting all of the cylinders. This conduit is completely filled with a fluid under a desired pressure with the result that, if the areas of the pistons are equal, the pulleys will all exert the same force on their respective belts regardless of how far any individual piston must move in order to take up the slack in the belt with which it is associated. Thus the tension in all of the belts is maintained equal at all times.

Throughout the present specification and claims it is to be understood that the term "belt" is used in its broadest sense to include all shapes and cross-sections, such, for example, as flat, round and V belts; and includes all materials such, for example, as leather, hemp, rubberized fabric and metal. It is contemplated, as well, that the term "belt" includes chains, which are a special form of belt. Similarly, the terms "sheave" and "pulley" are intended to include sprockets which usually would be substituted in the event that the belt takes the form of a chain.

Referring to the drawings wherein similar reference characters represent the same or equivalent parts:

Fig. 4 is a cross-sectional view along the line 4—4 of Fig. 3, part of Fig. 4 being illustrated in further cross-section to show some of the constructional details;

Fig. 5 is a cross-sectional view taken along line 5—5 of Fig. 3;

Fig. 6 is an enlarged view of the adjustable feature of the standing frame column shown in Figs. 1 and 2;

Fig. 7 is a cross-sectional view of a modification of the invention in which the pressure may be transmitted by a gas;

Fig. 8 is a cross-sectional view of an alternative modification of the invention in which small balls may transmit the required pressure;

Figure 1:
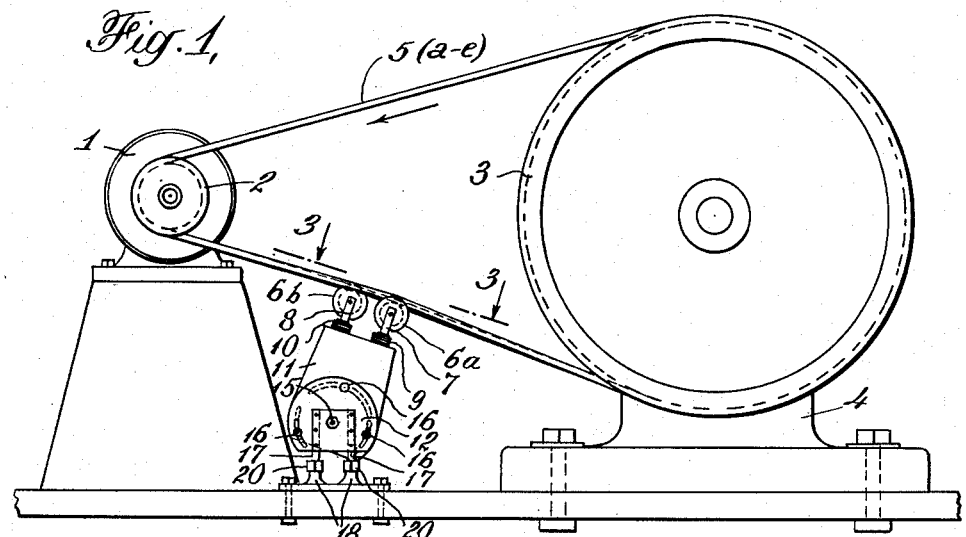
Fig. 1 illustrates a power transmission system wherein the present invention is applied to the lower, slack side of the belts.

Referring now to Figs. 1, 2, 3, 4 and 5, there is illustrated a prime mover or motor 1 on which is mounted a driver pulley or sheave 2, and a driven machine 4 on which is mounted a driven pulley or sheave 3. The driver sheave and the driven sheave are coupled by belts 5a to 5e, inclusive; and it is assumed that these belts are subject to unequal tension during operation. In Fig. 1 the arrow indicates that the driven sheave rotates counterclockwise so that the slack side of the belt is on the bottom. The idler pulley assembly is, therefore, placed so as to operate against the lower side of the belts. Similarly, in Fig. 2 the driver sheave is assumed to rotate in a clockwise direction so that the slack side of the belts is on the top, in which event the idler pulley assembly is placed to operate against the upper side of the belts. For purposes of illustration belts of the V type have been chosen, although, as stated above, any type of belt or chain may be employed.

Figure 3:
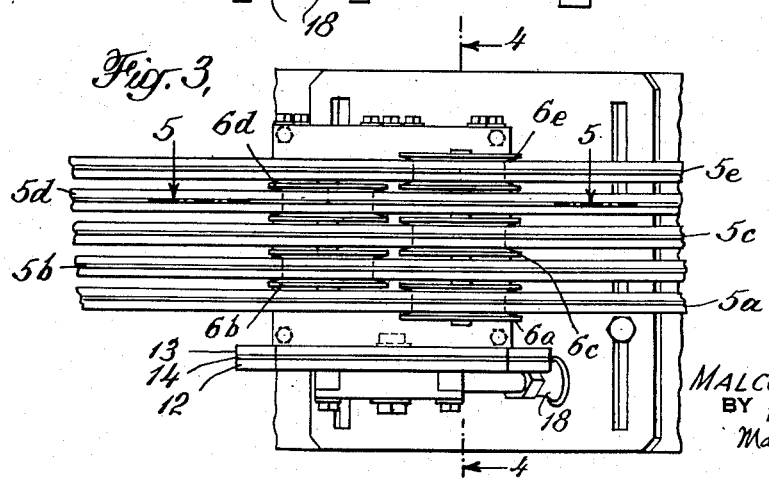
Fig. 3 is a top view of the idler pulley assembly looking in the direction 3—3 of Fig. 1.

In accordance with the invention the idler pulley assembly comprises a cylinder block 11 including, in this example, five cylinders arranged in two rows of three and two cylinders, respectively, staggered as shown in Fig. 3 so as to allow the belts to be spaced close together while leaving enough room for the idler pulleys and the mechanism which operates them. Any other suitable arrangement could, of course, be used.

As shown in Figs. 4 and 5 each cylinder, such as 22, contains a piston and a piston rod, the piston comprising a piston head 25, packing 24, and a packing retaining plate 23. Piston rod 7 is secured in the piston head 25 and extends through guide bearing 21 beyond the cylinder to support an idler pulley 6. This idler pulley should be shaped to fit the belt or chain with which it is to be used; in this instance it is shaped to fit the back of a V-belt. The exposed portion of the piston rod between the end of the cylinder and the idler pulley is preferably enclosed in a boot or bellows 9 serving the dual purpose of protecting it from dirt and other foreign matter, and at the same time retaining within the boot any oil or other fluid which might otherwise spatter on the idler pulley and belt. These boots may be folded or pleated so as to be expansible and may be of leather, woven fabric, or other suitable material. If it is found that considerable fluid collects within the boot, the excess can be drained off through suitable ports (not shown) machined in the cylinder block. The boot may be tightly secured to the end of the cylinder and to the end of the piston rod by being pressed into grooves by a spring retainer, as illustrated, or in any other convenient manner.

The cylinder block containing the required number of cylinders may be cast in one piece or may comprise several sections bolted or otherwise secured together. It has been found that for most purposes it is convenient and economical to make the cylinders separate for ready replacement. The cylinder head 27 may be cast in one piece and shaped on the inside to form a conduit 26 connecting all of the cylinders, this conduit at the same time serving as a reservoir for the contained fluid. Filler plug 28, preferably containing a valve, is shown in the center of piston head 27 to allow for the insertion of fluid under any pressure desired. This fluid may comprise, for example, an oil or a mixture such as is frequently employed in automotive hydraulic brake systems, or other substantially non-compressible liquids having characteristics suitable for the required conditions of service may be used. The invention also contemplates the similar use of gases or of small metal balls, all of which are intended to be included in the term "fluid."

If the reservoir is to be filled initially with a liquid, the filler plug 28 would first be removed and the liquid poured in until the entire system is filled to the top. Thereafter the filler plug can be reinserted and more of the liquid forced through the filler valve until the desired pressure is reached. Such pressure will move all of the pistons up in their cylinders and force the idler pulleys against their respective belts with equal pressures.

The cylinder block is supported on a standing frame column 18 which is preferably adjusted as to height so that the pressure on the belts may be roughly adjusted. This adjustment is more clearly shown in Figs. 2 and 6 wherein it is seen that the stationary columns 18 and sliding columns 17 contain holes 19 through which, when they register, is inserted, a pin. In addition, the conical top of the stationary standing column may be externally threaded and slotted vertically as shown in Fig. 6, so that it will be squeezed tightly against the sliding column when a compression collar 20 is screwed down upon it. Such a frictional engagement serves to make the adjustment permanent in spite of vibration. Other forms of vertical adjustment may be substituted, such for example, as a jack screw arrangement.

In addition to the vertical adjustment of the cylinder block just described, it is also desirable to provide an angular adjustment so that the idler pulleys may press against the belts at 90° to their line of motion. To this end, a movable plate 13 is secured to the cylinder block and a stationary plate 12 is secured to the top of the standing columns. A center bolt 15 through both plates allows the adjustable plate to rotate with respect to the stationary plate. Between these two plates is preferably placed a friction disc 14 which may, for example, be of the same material used for automotive brake linings. Locking bolts 16, of which three are shown, pass through a hole in one plate and a circular slot in the other, as illustrated; so that after the desired angular adjustment of the cylinder block is determined the adjustable and stationary plates may be drawn tightly and permanently together. It is contemplated that other equivalent expedients may be employed to secure the desired angular adjustment.

Although the drawings illustrate the cylinder block 11 as being supported by a standing frame column on only one end, it is intended that a duplicate standing frame column and the accompanying adjustment plates may be provided at the other end of the cylinder block as well, if such be required to furnish further support and rigidity. It has been found, however, that for some installations having only a few belts the idler pulley assembly need be supported only on one end, as herein illustrated.

Fig. 7 illustrates an embodiment of the invention which may be employed in the event that the fluid is of such nature that it is difficult to retain under constant pressure. This would be the case, for example, if the fluid be air or other gas. The embodiment of Fig. 7 is equivalent to that above described, but differs in certain details. For example the piston here comprises a piston head 25 and a skirt or sleeve portion 29 extending into the cylinder 22 and slidable therein. Filling the space within the several piston skirts and conduit 26 which interconnects them, is a bladder 30 of rubber or other elastic material which should be impervious to the fluid it contains. Roughly speaking, the bladder takes the form of a glove of which the "fingers" extend into the various cylinders. The bladder may be filled through filling valve 28 to a suitable pressure.

The alternative modification illustrated in Fig.

8 utilizes small hard balls, which may be of steel, in the place of the fluids described in connection with the preceding figures. Friction should be minimized by lubrication of the balls, in which event they comprise in effect a non-compressible fluid. In the present instance the piston is constructed substantially the same as in the modification of Fig. 7. In this instance, however, the pistons and the interconnecting conduit are filled with lubricated small steel balls 31. These balls may be inserted through a pipe placed in filling hole 33. In the present embodiment the cylinder head is not formed in one piece as in the preceding figure, but in two pieces, 27 and 34, the portion 34 being movable in a vertical direction as illustrated, so that it can be pressed down against the balls by compression screw 32 to adjust the pressure exerted against the pistons.

When employing the type of piston shown in Figs. 7 and 8 the piston guide bearing 21 frequently is not required, and therefore may be omitted. This type of piston may of course be used also with liquids as in the example illustrated in Figs. 4 and 5.

Figure 9:
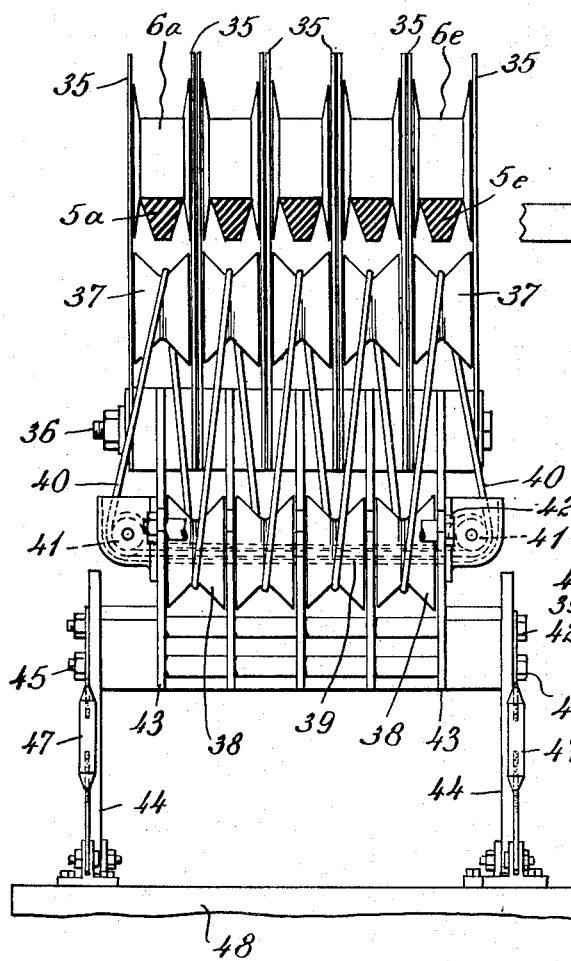
Figs. 9 and 10 are elevational and side views, respectively, of a second embodiment of the invention.
Figure 10:
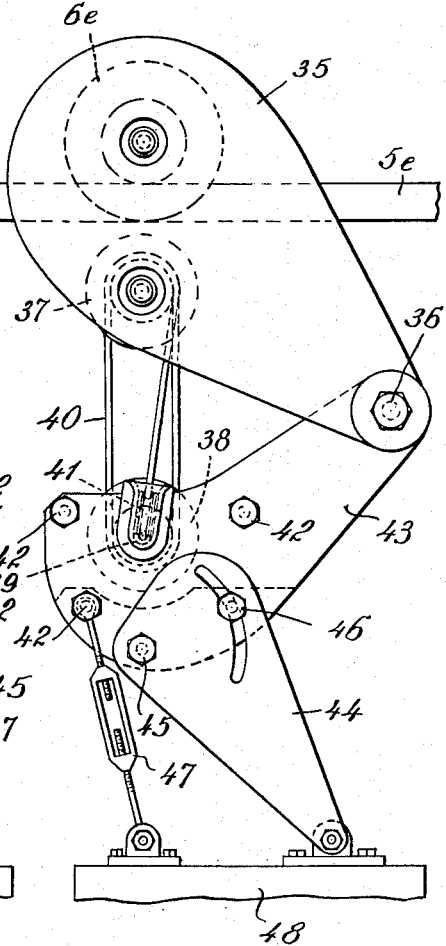

The embodiment illustrated in Figs. 9 and 10 is mechanical in the sense that the necessary force is applied to the idler pulleys by means of a cord or belt under tension, rather than by a fluid under pressure, as heretofore described. The illustrated example is arranged to be employed in connection with power-transmission belts of which the slack side is on the top, as in Fig. 2.

In this arrangement there is provided a series of idler pulleys one for each belt, as in the preceding arrangements, each idler pulley being free to rotate on an axle secured between a pair of movable hinge plates 35. Each idler pulley, such as 6a, presses against the flat side of one of the belts, such as 5a. For convenience in assembly, and to facilitate renewal of the power-transmission belts, the axles of idler pulleys 6 should be readily removable from hinge plates 35. Each pair of hinge plates 35, thus carrying an idler pulley and a movable pulley in tandem, moves independently on hinge-plate pin 36. Suitable spacers are inserted on pin 36 to separate the hinge plates to the width of the idler pulleys 6. Each pair of hinge plates also supports a movable pulley 37 between pin 36 and the idler pulleys 6. Fixed hinge plates 43 are mounted on pin 36 and are spaced so as to be fixed on the centerlines of pulleys 37. Between these fixed plates fixed pulleys 38 are mounted on a hollow axle 39. This hollow axle carries a flange at each end which may be welded or screwed to the outside hinge plates 43. It will be observed that there is one less fixed pulley than there are movable pulleys. Fixed plates 43 are separated by suitable spacers strung along assembly bolts 42. The assembly of fixed hinge plates is supported on pin 45 on which the assembly may rotate. Pin 45, in turn, passes through support plates 44 which are hinged to a suitable supporting base 48. Hinged at one end to the base 48 and at the other end to one of the plate assembly bolts 42 are turn-buckles 47, adjustment of which swings the fixed hinge plate assembly on pin 45. Laced or threaded around fixed pulleys 38 and movable pulleys 37 is a heavy tension cord 40. In the illustrated example, this cord is endless, and after leaving each end pulley 37 passes around half-turn pulleys 41 and through hollow axle 39.

Adjustment of turn-buckles 47 adjusts the pressure exerted by idler pulleys 6 upon their respective belts 5. This adjustment may be maintained by means of clamping nut 46 which may be tightened against support plate 44. The adjusted pressure will then be automatically maintained substantially constant on all of the belts 5, as will the tensions in them, regardless of the unequal lengths of the belts. This result is achieved by reason of the fact that the tension in cord 40 is substantially constant throughout its length, wherefore the tension between fixed pulleys 38 and independently movable pulleys 37 is constant and hence the pressure on idler pulleys 6 remains constant.

Tension cord 40 need not be of the endless type, in which event half-turn pulleys 41 may be omitted, and the two ends of cord 40 looped and clamped about the ends of a bolt (not shown) passing through hollow axle 39. Nuts on either end of such bolt may serve to secure tightly the two looped ends of the tension cord.

Figure 2:
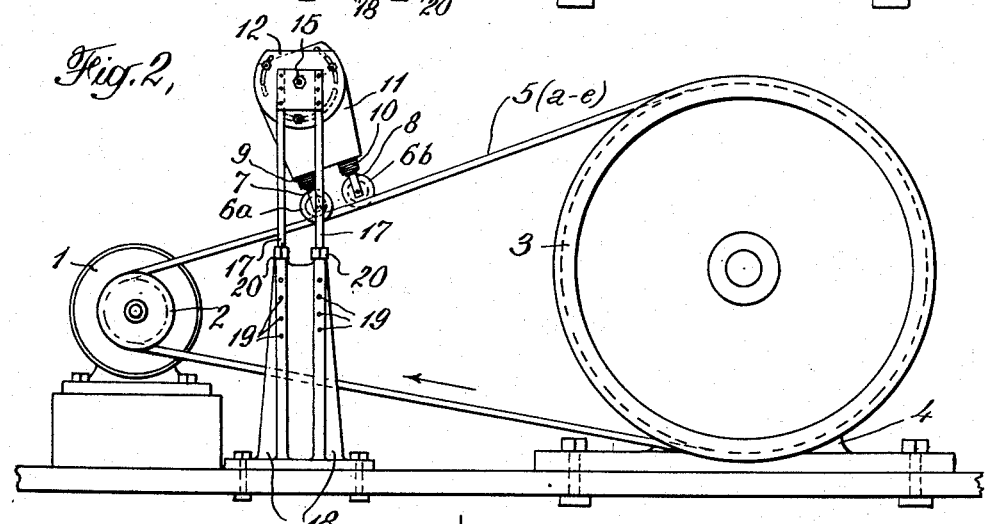
Fig. 2 shows a system similar to that of Fig. 1, except that the invention is applied to the upper, slack side of the belts.

Base 48 of the embodiment of Figs. 9 and 10 may be mounted upon an adjustable frame such as 18 of Fig. 2 to provide a suitable angular adjustment as well as a rough adjustment in height, such as described in connection with Figs. 1 and 2.

Various other embodiments and modifications of this invention will at once occur to those skilled in the art.

I claim:

1. An idler pulley assembly for use in multiple-belt power transmission systems, including an idler pulley for each belt, a set of fixed pulleys and a set of movable pulleys, each movable pulley being mounted in tandem with an idler pulley and being independently movable therewith with respect to said fixed pulleys, and a tension cord threaded around said fixed and movable pulleys.

2. An idler pulley assembly for use in multiple-belt power transmission systems, including a plurality of pairs of movable plates spaced apart and hinged at one end, each said pair supporting near the other end a first axle upon which an idler pulley rotates and a second axle secured intermediate said hinged end and said first axle, a movable pulley being mounted on said second axle, a plurality of fixed plates between each adjacent pair of which a fixed pulley is mounted, and a tension cord threaded around said fixed and movable pulleys, alternately.

3. An idler pulley assembly for use in multiple-belt power transmission systems, including a plurality of pairs of movable plates spaced apart and hinged at one end on a pin, each said pair supporting near the other end a first axle upon which an idler pulley rotates and a second axle secured intermediate said hinged end and said first axle, a movable pulley being mounted on said second axle and being movable with said idler pulley as a unit around said pin, a plurality of fixed plates through one portion of which said pin passes, fixed pulleys mounted on an axle passing through another portion of said fixed plates and through said fixed pulleys, alternately, a tension cord threaded around said fixed and movable pulleys, alternately, and means for adjusting the distance between said movable pulleys and said fixed pulleys whereby to adjust the pressure on all of said idler pulleys simultaneously.

4. An idler pulley assembly for use in multiple-belt power transmission systems, including a plurality of pairs of movable plates spaced apart and hinged at one end on a pin, each said pair supporting near the other end a first axle upon which an idler pulley rotates and a second axle secured intermediate said hinged end and said first axle, a movable pulley being mounted on said second axle and being movable with said idler pulley as a unit around said pin, a plurality of fixed plates through one portion of which said pin passes, fixed pulleys mounted on a hollow axle passing through another portion of said fixed plates and through said fixed pulleys, alternately, an endless tension cord threaded around said fixed and movable pulleys alternately and passing through said hollow axle, and means for adjusting the distance between said movable pulleys and said fixed pulleys whereby to adjust the pressure on all of said idler pulleys simultaneously.

5. An idler pulley assembly for use in multiple-belt power transmission systems, including an idler pulley for each belt, a set of fixed pulleys and a set of movable pulleys, each movable pulley being mounted with an idler pulley as a unit, each unit being independently movable with respect to said fixed pulleys, and a tension cord threaded around said fixed and movable pulleys.

6. An idler pulley assembly for use in multiple-belt power transmission systems, including an idler pulley for each belt, a set of fixed pulleys and a set of movable pulleys, each movable pulley being mounted with an idler pulley as a unit, each unit being independently movable with respect to said fixed pulleys, a tension cord threaded around said fixed and movable pulleys, an adjusting means for moving said fixed pulleys as a group with respect to said units as a group, whereby to adjust the tension in the power transmission belts simultaneously.

MALCOLM WILCOX MORSE.